(12) United States Patent
Cauwels

(10) Patent No.: US 6,629,794 B2
(45) Date of Patent: Oct. 7, 2003

(54) PORTABLE KEYBOARD APPARATUS

(75) Inventor: Patrick J. Cauwels, South Beloit, IL (US)

(73) Assignee: Motorola, Inc., Schaumburg, IL (US)

( * ) Notice: Subject to any disclaimer, the term of this patent is extended or adjusted under 35 U.S.C. 154(b) by 62 days.

(21) Appl. No.: 10/078,804

(22) Filed: Feb. 19, 2002

(65) Prior Publication Data

US 2003/0156878 A1 Aug. 21, 2003

(51) Int. Cl.[7] .................................................. B41J 5/16
(52) U.S. Cl. ........................ 400/492; 400/472; 400/477
(58) Field of Search ............................ 400/472, 489, 400/492, 477; 341/22

(56) References Cited

U.S. PATENT DOCUMENTS

| | | | |
|---|---|---|---|
| 5,141,343 A | * | 8/1992 | Roylance et al. ............ 400/472 |
| 5,574,481 A | * | 11/1996 | Lee .............................. 345/168 |
| 5,847,337 A | | 12/1998 | Chen |
| 6,019,530 A | * | 2/2000 | Lanzetta et al. ......... 400/491.1 |
| 6,068,417 A | * | 5/2000 | Butler ........................... 400/492 |
| 6,092,944 A | * | 7/2000 | Butler ........................... 400/492 |
| 6,111,527 A | | 8/2000 | Susel |
| 6,169,255 B1 | | 1/2001 | Tsai et al. |
| 6,178,619 B1 | | 1/2001 | Tai |
| 6,331,850 B1 | * | 12/2001 | Olodort et al. .............. 345/168 |
| 6,563,434 B1 | * | 5/2003 | Olodort et al. ................ 341/22 |
| 6,575,647 B1 | * | 6/2003 | Daniel ......................... 400/472 |
| 6,585,440 B2 | * | 7/2003 | Lin ............................. 400/681 |

FOREIGN PATENT DOCUMENTS

| | | |
|---|---|---|
| WO | WO 98/43156 A1 | 10/1998 |
| WO | WO 00/60438 A2 | 10/2000 |

* cited by examiner

*Primary Examiner*—Andrew H. Hirshfeld
*Assistant Examiner*—Dave A. Ghatt
(74) *Attorney, Agent, or Firm*—Brian M. Mancini

(57) ABSTRACT

A portable keyboard apparatus includes a set of movable parallel linkages connected at joints and configured to expand and collapse. A plurality of button assemblies, including associated actuators and contacts, is coupled to the parallel linkages, preferably at corresponding joints of the linkages. A plurality of electrical connections are configured to electrically couple the contacts of each button assembly actuator to the at least one input/output port.

13 Claims, 6 Drawing Sheets

PORTABLE KEYBOARD APPARATUS

FIELD OF THE INVENTION

The present invention relates generally to user interfaces. More particularly the present invention is directed to a portable keyboard apparatus.

BACKGROUND OF THE INVENTION

Handheld electronic devices, such as cellular radiotelephones are generally small and lightweight, making them portable and easy to carry. In addition, the current trend in portable communication devices is to provide more communication features. As a result of this trend, device operation has become more complex, adding features such as internet browsing, data handling, text messaging, video streaming and personal information management (PIM), and the like, in addition to typical voice communication operation. As a consequence these devices either increase in complexity of operation or must increased in device size to accommodate the needed user interface capability, both of which are contrary to the desire to reduce device size, weight and ease of use.

One solution currently being adapted is to add multiple functions to a single button say on the keypad of a cellular radiotelephone or a keystroke sequence inherent to the device. Each device mode type however requires a unique user interface that compliments the functionality of the different mode types and therefore requires that many functions be added to a limited number of buttons. This is tedious, unfamiliar and time-consuming, which often leads to operator confusion and increased complexity of device operation, inhibiting use.

Another solution is to exchange data between the portable device and a personal computing system by means of wire cables, infrared or RF transmitters and receivers, etc. However, such personal computing equipment is usually expensive, and may not be always available, convenient or portable.

Still another solution adapted to increase the user interface capability is the addition of external devices for data entry such as portable keyboards. Of course, a standard keyboard can be used in this way and has the benefit of its inherent familiarity, but the size of a standard keyboard cannot be considered as easily portable. Some other keyboard solutions use a standard keyboard configuration that folds. This type of device substantially increases the weight of the overall portable device making them less attractive to the user, thereby inhibiting use. Other keyboards have been configured on a flexible substrate. This type of device can only be rolled into a cylinder, which is cumbersome, or stored flat, which has no advantage over a standard keyboard as it is then full-sized. Still other keyboards use a scaled down version of a standard keyboard: using tiny keys, which are prone to input error and are cumbersome to use.

Accordingly, an apparatus is needed to allow easy data entry for a portable communication device while maintaining user familiarity. It would also be of benefit to provide a lightweight and portable solution while maintaining a low cost.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE INVENTION

The present invention describes an apparatus to allow an easy and familiar user interface for a portable communication device. In particular, the present invention includes a portable keyboard apparatus. The apparatus is low cost, lightweight, stowable, and configured substantially as a standard keyboard.

Wireless communication device trends indicate that radiotelephones will become more data centric, requiring a user interface that accommodates data entry operations. Current, existing radiotelephone keypad designs make data entry cumbersome and awkward reducing potential for data communications. The present invention provides a solution for an easy and familiar user interface for a communication device.

Figure 1:
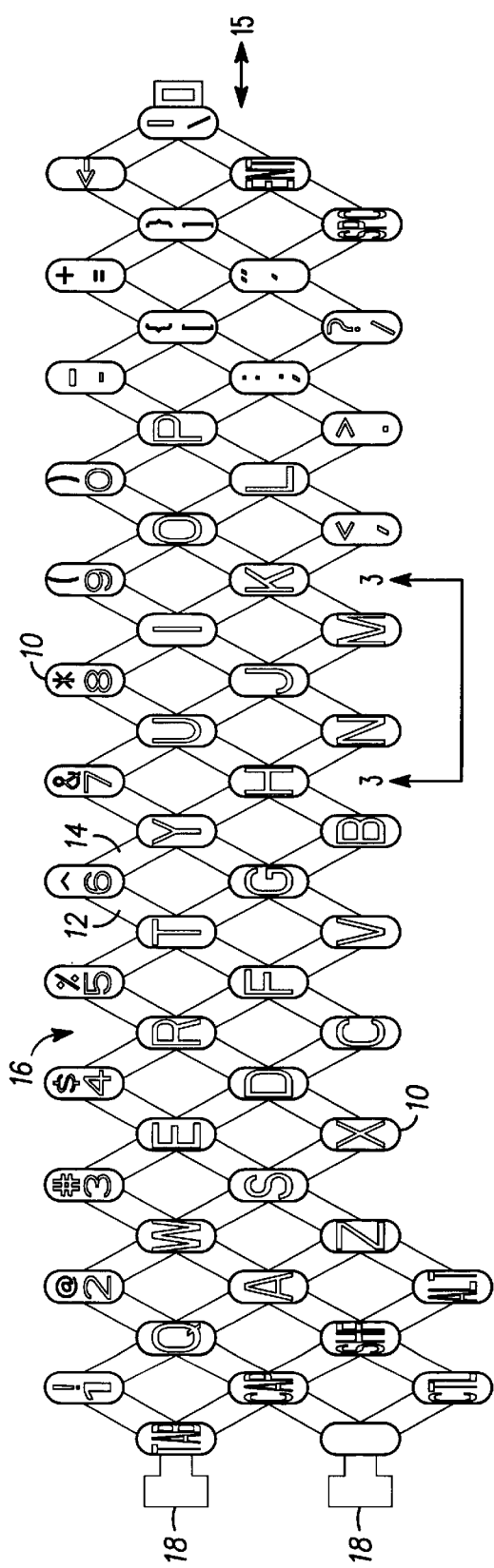
FIG. 1 is a top plan view of a first embodiment of a portable keyboard apparatus in an expanded position, in accordance with the present invention.
Figure 2:
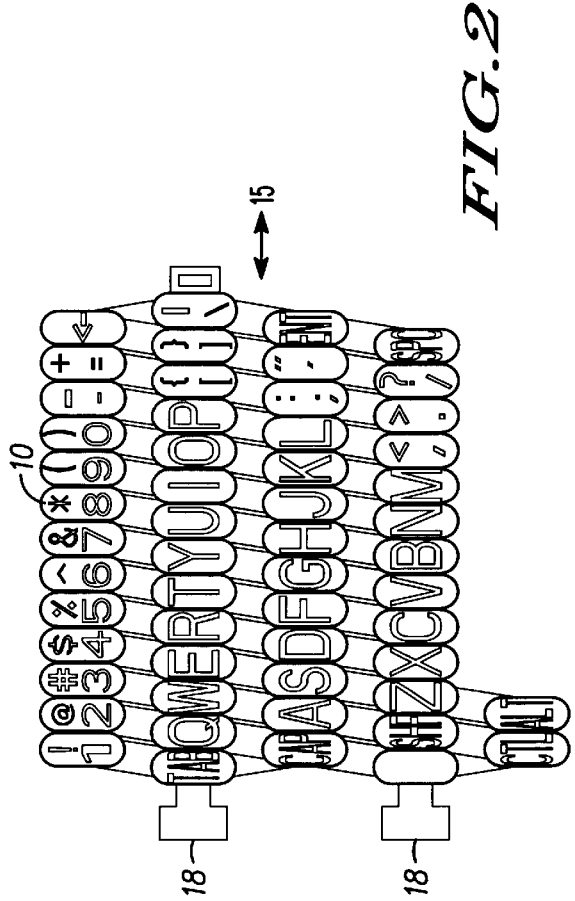
FIG. 2 is a top plan view of the portable keyboard apparatus of FIG. 1 in a collapsed position.

FIG. 1 shows a portable keyboard apparatus for use with a wireless communication device, in accordance with the present invention. A grid of button assemblies 10 defines the mechanical interface to a user, with a familiar spatial location of keys. The button assemblies 10 are configured for solid button actuation, and tactile feedback similar to that provided from a typical full-sized keyboard. The keyboard can be expanded or collapsed, as shown in FIG. 2 due to the operation of a set of parallel linkages 12, 14. In addition, the button assemblies 10 have an aspect that is narrower in the direction of the motion 15 of the parallel linkages than perpendicular to the motion 15 of the parallel linkages so as to provide a more compact keyboard profile when the parallel linkages are collapsed. In other words, button assemblies that are narrow allow for a narrower collapsed profile of the keyboard. In practice, the button assemblies are arranged substantially in the configuration of a QWERTY keyboard. However, any different arrangement, number, and size of keys can also be used successfully.

In particular, the present invention is a portable keyboard apparatus that includes a set of movable parallel linkages 12, 14 connected at joints 16 and configured to expand and collapse. A plurality of button assemblies 10, including associated actuators, are coupled to the parallel linkages 12, 14. Preferably, each the button assemblies 10 are located and mechanically coupled at the various joints 16 of the parallel linkages 12, 14. Each button assembly 10 is located at a joint 16, but it is not necessary that each joint have an associated button assembly.

The keyboard also includes at least one input/output port 18, to electrically couple the keyboard to an associated device, such as a portable communication device for example. The input/output port 18 is operable to communicate with a host communication device through at least one of the group of a wired communication link or wireless communication link.

The keyboard also includes a plurality of electrical connections that are configured to coupled electrical contacts actuated by each button assembly actuator to the at least one input/output port 18. The electrical connections and contacts are provided by a flexible circuit, and can include membrane switches, circuitry, and logic similar to a standard keyboard.

Figure 3:
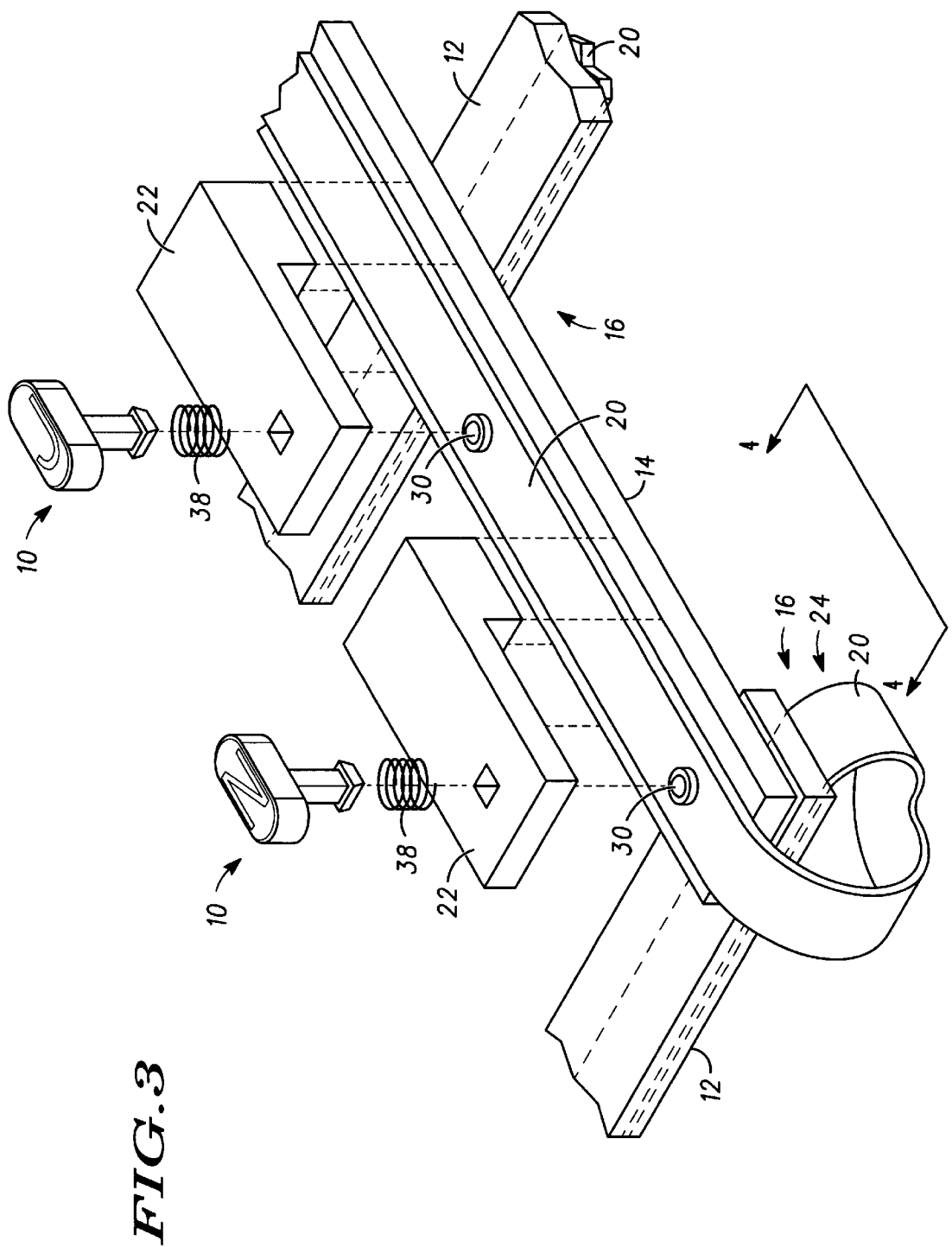
FIG. 3 is a partial perspective view of the assembly of the portable keyboard apparatus of FIG. 1.

In a first embodiment as represent in FIG. 3, the electrical connections 20 are disposed on the parallel linkages 12, 14. In this case, each button assembly 10 is fixed to one arm 14 of the parallel linkages using a button assembly mount 22 or other similar apparatus. To connect the entire keyboard it is necessary that the electrical connections be flexibly connected at predetermined joints 24 of the parallel linkages 12, 14 to provide electrical continuity between connecting arms 12, 14 of the parallel linkages. Alternatively, electrical rotating slip couplings can be used, but this is less reliable. This first embodiment has the advantage that the keyboard is operable in any position of the parallel linkages, and no other appliance is needed. It should be noted that having the button assemblies fixed with respect to one arm of the parallel linkages causes the button assemblies to rotate slightly (not shown) between the collapsed and expanded position of the keyboard. Preferably, the button assemblies are fixed such that they appear substantially upright when the keyboard is expanded (as shown in FIG. 1). Collapsing the keyboard will cause the keys to remain parallel but slightly angled from the upright, slightly limiting the amount of closure in the collapsed state. Alternatively, each button assembly can float in the joint assembly and can include a cam and guide to maintain an upright orientation independent of the state of expansion of the keyboard.

Figure 4:
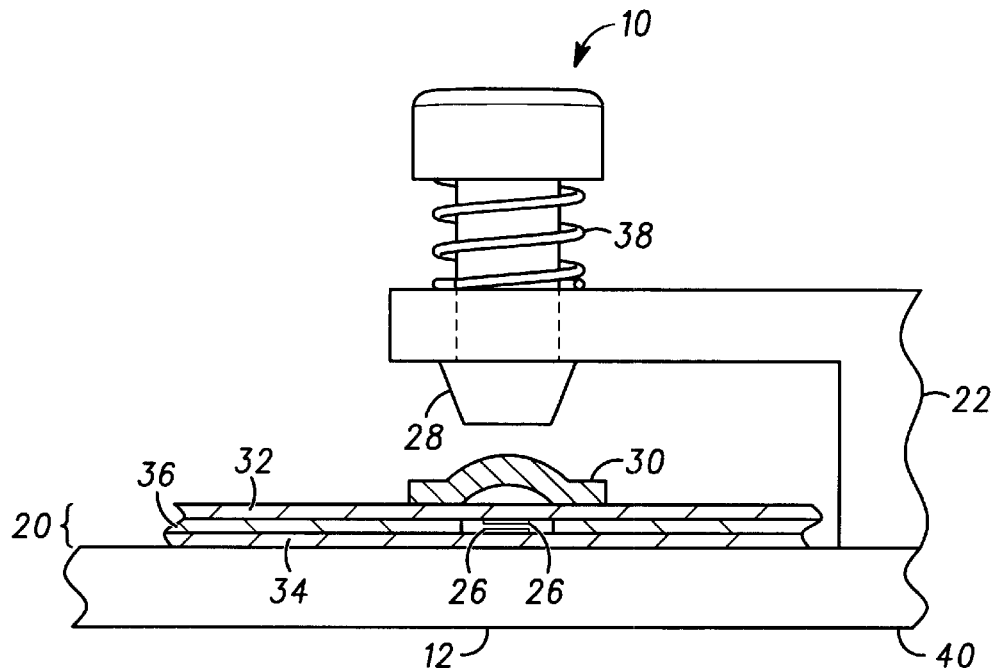
FIG. 4 is a partial cross-sectional view a key assembly of FIG. 3.

As shown in FIG. 4, the electrical connections 20 include a set of contacts 26 for operable by an actuator 28 of each button assembly 10. A protective rubber membrane 30 can be used to protect the contacts 26 from dirt. The electrical connections typical include a three layer structure wherein a top conductor 32 is coupled with one electrode of the contacts 26, a bottom electrode 34 is coupled with the other electrode of the contacts 26, and an insulative layer 36 keeps the contacts 26 apart until forcibly engaged by the button assembly actuator 28 through compression of the membrane 30. A spring mechanism 38, of any configuration known in the art, can be used to disactuate the button assembly.

Figure 5:
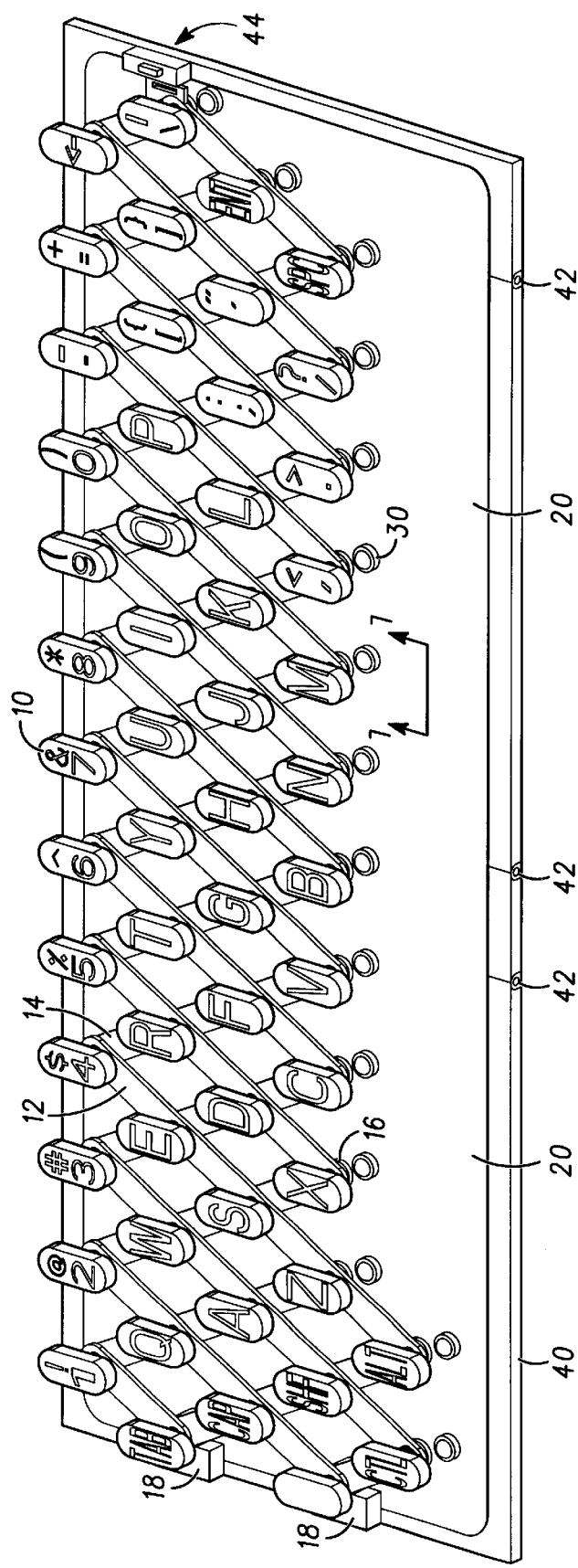
FIG. 5 is an exemplary perspective view of a second embodiment of a portable keyboard apparatus in an expanded position, in accordance with the present invention.
Figure 6:
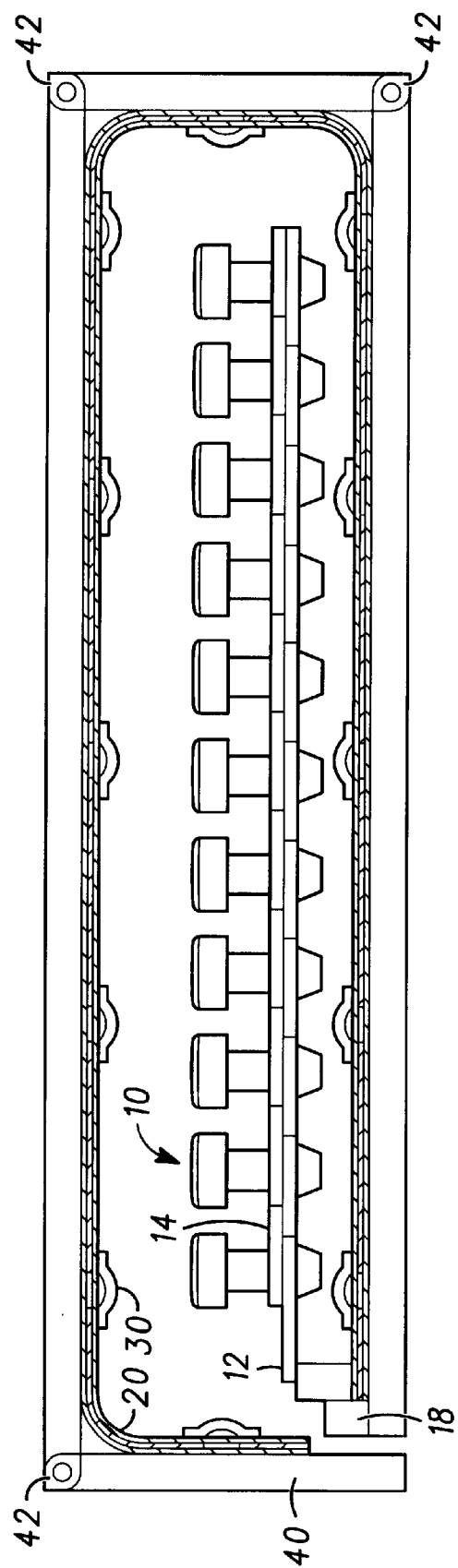
FIG. 6 is a side view of the portable keyboard apparatus of FIG. 5 in a collapsed position.

As shown in FIG. 5, the present invention benefits by the use of a foldable housing 40 for substantially enclosing the keyboard while collapsed to protect it from dust or damage. The foldable housing provides stabilizing support when in use with desirable cosmetic and protective features. The housing 40 also includes appropriate hinges 42 to allow the unit to collapse into a neat, portable package (as represented in FIG. 6). Preferably, the housing is of a hard material such as plastic, but can be of a flexible material, also. In this embodiment, the housing has a first position or stowed position, folded around the collapsed keyboard, as shown in FIG. 6. The housing can be unfolded from the keyboard, and the keyboard can then be expanded for use, as shown in FIG. 5. The housing can include a latch mechanism 44 to engage a portion of the keyboard such that the keyboard serves to hold the keyboard and housing 40 securely in a flat position when opened while fixing the parallel linkages in an expanded position. Preferably, the keyboard is spring loaded to maintain the housing in an open position. The latch 44 can also insure proper alignment of actuators of the button assemblies to the contacts of the electrical connections by retaining the location of the keyboard in a given position with respect to the housing. Moreover, the outer edges of the housing can be magnetized to hold them in the stowed position.

In a preferred embodiment as shown in FIG. 5, the electrical connections are disposed on the foldable housing 40 instead of on the set of parallel linkages. Due to the folding nature of the housing, the electrical connections 20 are necessarily flexible. In operation, the electrical connections 20 are disposed on a top surface of the unfolded housing 40 in proximity to the button actuators of the expanded keyboard such that a button actuation will connect the button contacts. Further, the foldable housing can include a latch 44 to fix the parallel linkages to maintain the button assembly contacts in proper orientation with the electrical connections when the keyboard is expanded. In this way, the contacts are located in proximity to the button actuators of the expanded keyboard such that a button actuation will connect the button contacts to the electrical connections. It should be noted that the electrical connections need not be affixed to the housing but need only be laid upon the housing.

Figure 7:
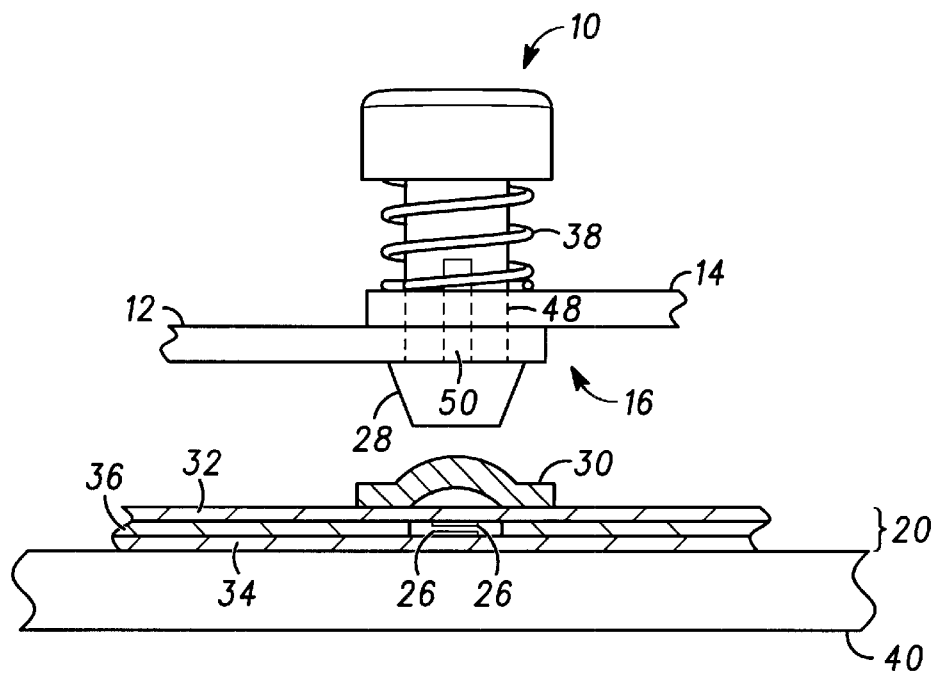
FIG. 7 is a partial cross-sectional view a key assembly of FIG. 5.

FIG. 7 shows the button assembly 10 and electrical connection 20 layout, which is similar to that explained for FIG. 4 above with the exception of having the electrical connections on the housing 40 instead of on the parallel linkages 12, 14. In a preferred embodiment, the button assembly forms the actual joint by including a connecting member 48 through the arms 12, 14 of the parallel linkages at the joint 16, wherein the arms 12, 14 can be pivoted about the connecting member 48. At least one key 50 is disposed on the connecting member 48 to facilitate alignment of the button in the parallel linkages. For example, FIG. 8 shows a clearer view of the button with two keys 50 molded into the connecting member 48, which is configured for easy assembly.

Figure 8:
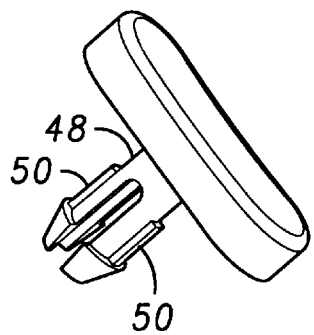
FIG. 8 is a perspective view of a preferred embodiment of a key for use in the portable keyboard apparatus of FIGS. 5 through 7.
Figure 9:
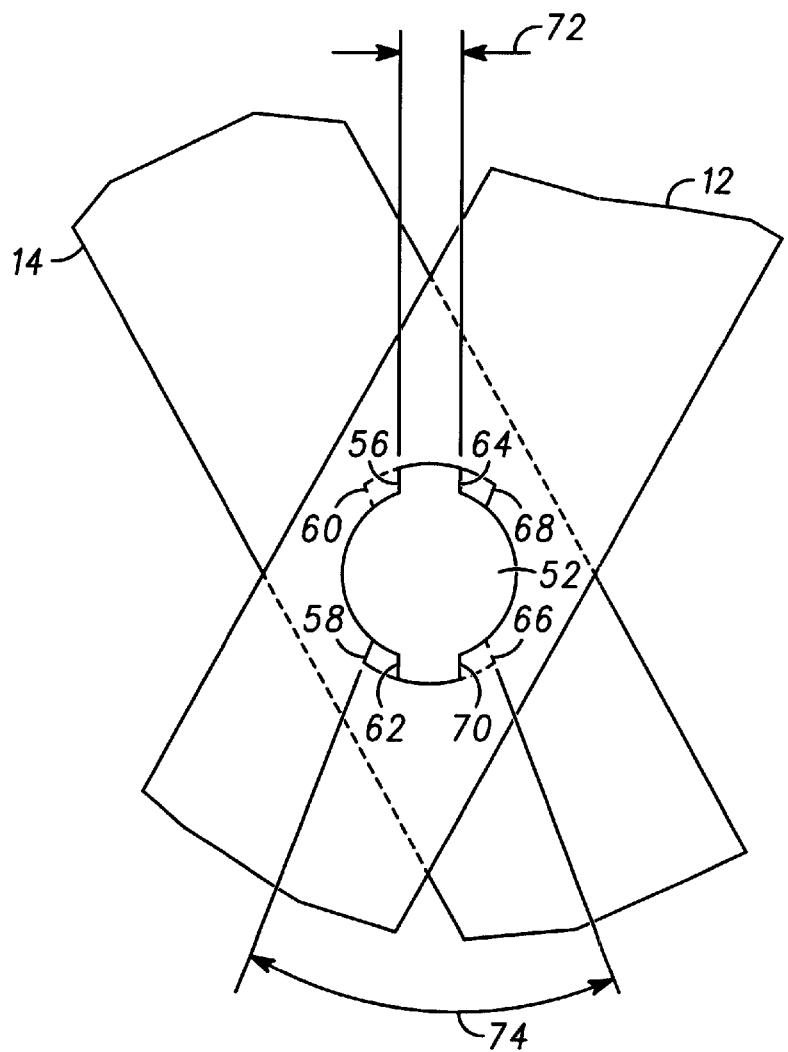
FIG. 9 is a top plan view of a preferred embodiment of the parallel linkage attachment for the portable keyboard apparatus of FIGS. 5 through 8.

FIG. 9 shows a preferred embodiment of a joint of the parallel linkages, for use with the button of FIG. 8. Each of the linkages include a round hole 52 to engage the connecting member 48 of the button and keywalls to define at least one keyway 72, 74 to engage the at least one key 50 of the button. In particular, linkage 12 has keyway walls 56, 68, 58, 70, and linkage 14 has keyway walls 60, 64, 62, 66, wherein keyway walls 64 and 62 are visible through linkage 12 and keyway walls 60 and 66 are hidden under linkage 12. The keyway walls serve to define the at least one keyway 72, 74 to engage the at least one key 50 of the button to maintain the button in an upright alignment when the linkages are fully expanded or collapsed. The keyway walls can also serve to limit the amount of total keyboard expansion or collapse.

In practice, when the linkages 12, 14 are fully expanded (as shown) a top keyway 72 is formed by one keyway wall 56 of the top linkage 12 and one keyway wall 64 of the bottom linkage 14 to capture a top key of the button in an upright position. Correspondingly, a bottom keyway is also formed by one keyway wall 62 of the bottom linkage 14 and one keyway wall 70 of the top linkage 12 to engage the other key of the button if present. When the linkages are collapsed keyway 72 opens up and opposing keyway 74 collapses to engage, in an upright position, the other bottom key of the button if present, which is then captured by keyway wall 58 of the top linkage 12 and keyway wall 66 of the bottom linkage 14. Correspondingly, a top keyway is also formed by one keyway wall 60 of the bottom linkage 14 and one keyway wall 68 of the top linkage 12 to engage the top key of the button. More preferably, the keyway walls in the linkages are configured at an angle such that linkages 12 and 14 have identical construction, with one of the linkages flipped over during assembly to provide a complimentary or mirror image keyway configuration.

The keyboard can also include additional user interface devices. The user interface devices can be any one of many user interfaces, or combination thereof. This can include, a touchpad or mouse, writing or graphics tablet, audio devices such as a microphone or speaker, or video devices such as a display or camera, for example.

The keyboard is electronically coupled to the portable electronic device through a wired or wireless link, via at least one input/output port. In one embodiment, shown in FIGS. 1 and 5, a connector for the input/output port 18 is disposed on a side of the housing. Communication can now occur between the portable electronic device and the keyboard. The connector has a plurality of electrical contacts or pins that engage corresponding electrical contacts of the wired link to the portable electronic device, as is known in the art. The electrical contacts are assigned in accordance with a standard configured arrangement for a keyboard.

If the link between the electronic device and keyboard is wireless, a transceiver in the electronic device communicates with a transceiver (not shown) in the keyboard. In this embodiment, the keyboard includes its own power source to power its transceiver. The wireless link could be established through Bluetooth, IrDa, or any short range RF transmission. This would further allow the keyboard to communicate with the portable electronic device within short distances from the keyboard.

Preferably, the keyboard is adapted to accommodate the operation of the portable electronic device. However, the keyboard can be used in any situation where a standard keyboard is used. In particular, the keyboard has buttons substantially arranged thereon in a QWERTY arrangement. In a first position, the keyboard is collapsed, used generally when the keyboard is not in use, or stowed away. In a second position, the keyboard is expanded, used generally when the keyboard is in use for text or data entry.

In another embodiment, the keyboard can be a multipurpose keypad (not shown) having a set of buttons unique to the associated application. The keys or buttons can be arranged in any configuration necessary to further operation of a device. The keyboard can interact with a display of the device to enter data therein. This could be for such functions as email, SMS, word processing, and the like, in a communication device for example. Power may be switched at the keyboard or automatically controlled by the portable electronic device. For example, power to the keyboard can be applied or removed when connection is made to the input/output port. Buttons on the keyboard can correspond to functions of the corresponding portable electronic device. This increases the usefulness of the keyboard as the portable electronic device may employ or assign several functions to one key or button on the keyboard.

While the invention has been described in detail above, the invention is not intended to be limited to the specific embodiments as described. It is evident that those. skilled in the art may now make numerous uses, modifications of, and departures from the specific embodiments described herein without departing from the inventive concepts.

What is claimed is:

1. A portable keyboard apparatus, comprising:
    a set of movable parallel linkages connected at joints and configured to expand and collapse;
    a plurality of button assemblies including associated actuators, each of the button assemblies coupled to the parallel linkages;
    at least one input/output port;
    a plurality or electrical connections, the electrical connections include contacts coupled to the at least one input/output port, the contacts operable by each button assembly actuator; and
    a foldable housing for substantially enclosing the keyboard while collapsed, and wherein the foldable housing serves as a backing support for the keyboard when the housing is unfolded and the keyboard is expanded.

2. The apparatus of claim 1, wherein each of the button assemblies are mechanically coupled to the parallel linkages at a corresponding joint.

3. The apparatus of claim 2, wherein each button assembly is fixed to one arm of the parallel linkages, and wherein the electrical connections are disposed on the parallel linkages including the contacts actuated by each button assembly, and wherein the electrical connections are also flexibly connected at predetermined joints of the parallel linkages to provide electrical continuity between connecting arms of the parallel linkages.

4. The apparatus of claim 1, wherein the keyboard is operable in any position of the parallel linkages.

5. The apparatus of claim 1, wherein the button assemblies have an aspect that is narrower in the direction of the motion of the parallel linkages than perpendicular to the motion of the parallel linkages so as to provide a more compact keyboard profile when the parallel linkages are collapsed.

6. The apparatus of claim 1, wherein the at least one input/output port is operable to communicate with a communication device through at least one of the group of a wired communication link or wireless communication link.

7. The apparatus of claim 1, wherein each of the button assemblies include a button with a connecting member having at least one key, and each of the parallel linkages include keyway walls at a corresponding joint, wherein the keyway walls capture the at least one key of each button to align the button in an upright position when the parallel linkages are in a collapsed and expanded position.

8. The apparatus of claim 1, wherein the electrical connections are disposed on a top surface of the unfolded housing with contacts in proximity to the button actuators of the expanded keyboard such that a button actuation will connect the associated contacts of the electrical connections.

9. A portable keyboard apparatus, comprising:
    a set of movable parallel linkages connected at joints and configured to expand and collapse;
    a plurality of button assemblies including associated actuators and contacts, each of the button assemblies coupled to tie parallel linkages to provide a connecting mechanism for each corresponding joint of the parallel linkages;
    at least one input/output port;

a foldable housing for substantially enclosing the keyboard while collapsed, and wherein the foldable housing serves as a backing support for the keyboard when the housing is unfolded and the keyboard is expanded; and a plurality of electrical connections disposed on a top side of the unfolded housing, the electrical connections include contacts coupled to the at least one input/output port, the contacts operable by each button assembly actuator.

10. The apparatus of claim 9, wherein the foldable housing contains a latch to fix the parallel linkages to maintain the button assembly actuators in proper orientation with the contacts of the electrical connections when the keyboard is expanded.

11. The apparatus of claim 10, wherein the contacts of the electrical connections are located in proximity to the button actuators of the expanded keyboard such that a button actuation will connect the button contacts.

12. The apparatus of claim 9, wherein the button assemblies have an aspect that is narrower in the direction of the motion of the parallel linkages than perpendicular to the motion of the parallel linkages so as to provide a more compact keyboard profile when the parallel linkages are collapsed.

13. The apparatus of claim 9, wherein each of the button assemblies include a button with a connecting member having at least one key, and each of the parallel linkages include keyway walls at a corresponding joint, wherein the keyway walls capture the at least one key of each button to align the button in an upright position when the parallel linkages are in a collapsed and expanded position.

* * * * *

UNITED STATES PATENT AND TRADEMARK OFFICE
CERTIFICATE OF CORRECTION

PATENT NO. : 6,629,794 B2
DATED : October 7, 2003
INVENTOR(S) : Cauwels

It is certified that error appears in the above-identified patent and that said Letters Patent is hereby corrected as shown below:

<u>Column 6,</u>
Line 63, reads "tie", should be -- the --.

Signed and Sealed this

Twentieth Day of January, 2004

JON W. DUDAS
*Acting Director of the United States Patent and Trademark Office*